Patented Feb. 20, 1940

2,190,672

UNITED STATES PATENT OFFICE 2,190,672

WATER-SOLUBLE PHENOL-ALDEHYDE RESINS

Virgil E. Meharg, Bloomfield, N. J., assignor to Bakelite Corporation, New York, N. Y., a corporation of Delaware No Drawing. Application March 14, 1936, Serial No. 68,915

10 Claims. (Cl. 260—30)

This invention relates generally to resinous phenolic condensation products derived from phenolic bodies and agents containing reactive methylene or substituted methylene groups, and more particularly, to reactive resinous compositions which are soluble in and/or miscible with water.

It is well known that phenol and formaldehyde may be condensed to form phenol mono-, di-, and poly- alcohols, which products are characterized by varying water solubility. The preparation of the alcohols is usually effected by the use of a large amount of an alkaline catalyst and carrying out the reaction at room or lower temperatures for a long period of time.

Solutions of these phenol alcohols, when used for impregnating or coating purposes, air dry to tacky, sticky, hygroscopic films which readily blister on baking. These solutions are miscible with water when freshly prepared but invariably such compositions lose their complete solubility or miscibility with water in less than a week, and solutions, on standing, even at room temperature, increase in viscosity rather rapidly and tolerate the addition of smaller and smaller quantities of water, and rather quickly become completely immiscible. I prefer to characterize such solutions as having a low-time-dilution factor and it is an object of this invention to prepare aqueous compositions containing resinous condensation products which possess a high-time-dilution factor. This may be defined by the amount of water required to produce turbidity when added to a definite quantity of the herein described compositions at stated intervals from the time at which such compositions were originally prepared. It is also an important object of this invention to prepare compositions which will maintain a relatively unvarying time dilution factor, that is, solutions which will tolerate the addition of large amounts of water even after weeks and months of standing; further, that the amount of water tolerated will remain practically constant over a considerable period of time, decreasing only slightly as the material ages.

Another object of the invention is the preparation of such water-compatible compositions in a simple and practical manner, that is by a process which can be used commercially. In accordance with my invention the resinous compositions can be prepared in not more than 5 or 6 hours instead of one or more days, and with a small quantity of catalyst. Also by proceeding in accordance with my process, it is possible to escape the formation of large amounts of phenolates and neutralization of the excess catalyst. I am also able to prepare compositions which are relatively free from salts and which even though compatible with water when made and for a long time thereafter, have high electrical insulation characteristics and are non-hygroscopic when once dried. In prior process of which I am aware a relatively large amount of catalyst has been required and produces a large amount of phenolates; to get rid of the phenolates requires neutralization of the catalyst and this neutralization produces rather large quantities of objectionable salts. If these salts remain in the composition they lower the electrical insulation value of the composition either by being themselves electrically conducting or by absorbing water. If the salts can be eliminated by washing them out of the composition with water, a water-soluble resinous product is obviously not obtained, and water soluble resinous products are the object of the present invention. If large quantities of water-insoluble salts are formed from neutralized phenolates their removal is difficult and involves a considerable loss of resin.

The invention described herein is rendered practical by the use of a relatively small proportion of formaldehyde. In general I prefer to combine from 1.10 to 1.75 mols of the formaldehyde body with 1 mol of the phenolic body using from 1.10 to 1.85 mols of the formaldehyde body in the reaction ingredients. Of course a larger proportion of the formaldehyde body may be introduced in the initial reactants; however, the larger proportion is undesirable but may be used where the reacting conditions are such that formaldehyde escapes during the reaction. I have discovered that there appears to be a relation between the molecular weight of the phenolic body, the proportion of formaldehyde and the water solubility of the resultant product so that more formaldehyde is desirable for phenolic bodies of higher molecular weight, for instance with 1 mol of phenol I prefer to react from 1.10 mols to say 150 mols of formaldehyde while with cresol and xylenol I prefer to react say from 1.35 mols to 1.75 mols of formaldehyde, etc. In practicing this invention, however, one should not be mislead into endeavoring to obtain water solubility by the use of excess formaldehyde. It is desirable to have sufficient formaldehyde present in the final product so that it is reactive and hardens under heat, for instance a baking temperature of about 100 to 140° C. for 2 to 4 hours, to a condition of maximum strength, hardness and heat resistance such that after drying and baking at 165° C. there is only a loss of 6% by weight of the original composition on heating 1 hour at 316° C. with no blistering; but excess formaldehyde, while it produces water solubility, either combines with the phenolic body to produce the phenol alcohols which air dry to tacky, sticky, hygroscopic films or remains in a more or less free condition and produces blistering in the final product with a lowered strength, hardness and heat resistance. Also the water soluble alcohols give off rather large quantities of formaldehyde when heated. The resinous product of this invention therefore contains 1.10 mols or more of formaldehyde per mol of phenolic body and preferably contains no free formaldehyde but may contain from 0.1 to 0.2 mol free formaldehyde if the hereinbefore described larger quantities of formaldehyde are used and even more free formaldehyde, if carelessly made. However, with substantially no free formaldehyde the composition is still compatible with water for a longer period than two weeks, and does not separate from the water as crystals if the catalyst is neutralized nor is an oily water insoluble layer formed during the condensation reaction. Also the condensation product does not give off large quantities of free formaldehyde when heated as do the water soluble alcohols. The resinous condensation product of this invention is normally clear at all times and its water solution is normally clear, that is there is normally no cloudy or opaque characteristic although, of course, various cloudy, translucent, and opaque effects may be obtained by adding to or forming within the mass insoluble bodies, fillers, etc. to produce the desired characteristics. Furthermore the water solutions of the reactive condensation products of this invention (60% resin and 40% water) are characterized by a relatively low viscosity of from 30 to 40 k. v. at 25° C. with 35 k. v. as average and after standing for three months the average viscosity is only about 44 k. v. with a possible high of 60 k. v. A sol gives a relatively high viscosity mixture with water and an opalescence when highly diluted and a sol can be precipitated from the water by relatively small quantities of tribasic salts but cannot be redissolved thereafter. The water solutions of the reactive condensation products of my invention do not normally produce opalescence and the condensation products cannot be precipitated as can a sol although they can be "salted out", for instance by an inorganic salt, for example sodium chloride but can be redissolved in water after being thus salted out.

In order to prepare resinous compositions of the above type, I discovered that it is necessary to correlate duration time of the reaction, temperature of the reaction, hydrogen ion concentration during the reaction period, hydrogen ion concentration after the reaction period and the ratio of the reactants.

For practical and commercial preparation the reaction time should be as short as possible, usually not more than 5 or 6 hours and preferably an hour or two less, and by maintaining the temperature of the reaction at approximately 60° C. it has been found possible to shorten the reaction time such that the process becomes commercially feasible. Temperatures higher than 80° C. are to be avoided and preferably the reaction temperature is considerably higher than room temperature, say in the neighborhood of 40° C. for the low temperature.

The hydrogen ion concentration of the reaction mixture during the course of the reaction has been found to be of great importance. If less than 7, as determined by the use of a glass electrode of the Leeds and Northrup type, it will usually be found that insufficient formaldehyde will condense with the phenol to give the desired resinification yet obtain the complete miscibility with water. A pH greater than 10 during the reaction period is undesirable since it has been found that higher pH values favor the production of phenol alcohols and require large amounts of catalysts, which are to be avoided as previously pointed out.

The ratio of the reactants is important. Too great an excess of formaldehyde produces the phenol alcohols which blister during the subsequent hardening of the resin; also the excess formaldehyde increases the cost of the product. One and one-tenth to one and seventy-five hundredths mols of reacted formaldehyde to one of the phenolic body have been found to give the most satisfactory results under the conditions herein described where analysis shows substantial absence of free formaldehyde at the end of the reaction. This analysis is conveniently done by titration with standard sodium sulfite solution in the known manner.

After completion of the reaction whereby reactive resins instead of alcohols are obtained the hydrogen ion concentration is adjusted rather definitely to about 7.6. pH values from about 6.5 to 8.5 may be used with a fair degree of stability in the mass as it contains reactive resins instead of alcohols. Using a pH of 7.5 to 7.6 as a standard, a pH of 6.75 gives a stability of 60%, that is if a solution with a pH of 7.55 will keep for 200 days and then show signs of turbidity upon the addition of a given amount of water, a solution with a pH of 6.75 will show signs of turbidity when diluted with the same amount of water after 120 days. A pH of 3.5 gives only a 35% stability and a pH of 8 gives a 90% stability.

A novel feature of this invention resides, therefore, in the discovery that phenol and formaldehyde may be condensed to the resinous state in aqueous solution and yet retain their initial miscibility with water such that they tolerate practically any desired dilution up to substantially infinite dilution with water even after long aging. The resin is not precipitated when its solution is in the proportion of about 30 parts resin and 70 parts water. When thrown or salted out by excess electrolytes these materials are distinctly resinous in character, yet they retain their complete water miscibility.

In order to illustrate more clearly how this invention may be exercised and compositions possessing a relatively constant time dilution factor can be prepared, the following example is given herewith, but it is to be clearly understood that it is purely an example and constitutes no limitation on the present invention. Phenol, cresol, xylenol or the like, and formaldehyde, paraform or their equivalent, are mixed in such proportions that from 1.1 to 1.85 mols of the aldehyde are present for each mol of phenol used. These materials are then mixed with such quantities of basic material, for instance fixed alkalis and their equivalents that the pH of the resulting mixture is of the order of 8.5 to 9 although the pH may vary between 7 and 10. The materials are then heated at temperatures of the order of 60° C. until analysis indicates the substantial absence of free formaldehyde (usually 3 to 3½ hours preferably with not more than .4 mol of free formaldehyde starting with 1.85 mols thereof and usually considerably less than .2 mol, for example from none to .1 mol starting with lower amount of formaldehyde), after which sufficient acid is added such that the pH is approximately 7.6. Although organic acids, for instance oxalic acid, may be used, a mineral acid is generally preferred and the choice may depend upon whether salts of the acid and catalyst are to be removed from or remain in the finished product. The mixture is dehydrated under vacuum until a solution having a solid content of approximately 60% is obtained. The content of free formaldehyde (if any) will be reduced during dehydration with this pH.

The temperature at which the materials are reacted varies somewhat according to the phenol or aldehyde used; for example, cresols, xylenols and other high molecular weight homologs of phenol are preferably reacted at lower temperatures while the substitution of paraform for aqueous formaldehyde requires a higher temperature. The proportions of the reactants may be varied somewhat according to the materials used, and when employing the higher homologs of phenols which are reacted at the lower temperatures, I prefer to use a higher initial formaldehyde ratio; for example phenol is preferably reacted at 60° to 65° C. with a formaldehyde ratio of 1.10 to 1.50 mols per mol of phenol, whereas cresol and xylenol are preferably reacted at a temperature of 40° to 50° C. with an initial formaldehyde ratio of 1.35 to 1.85 mols per mol of cresol or xylenol. It is thus usual that the aldehyde and the phenol be mixed in such proportions that there is about 1.35 to 1.5 mols of aldehyde to each mol of the phenolic body. In order to secure maximum storage stability and maximum solubility or miscibility of the product with water, the pH of the resin after reaction should be of the order indicated, although when preparing resins for special purposes the pH may be as low as 3.5 or as high as 8.5, for instance a pH of 8.5 gives a rather high rate of reactivity at elevated temperature and a pH of 3 gives a rather low reactivity.

As a more specific example of the preparation of compositions of this invention, 100 parts of phenol, 129 parts of formalin (37% solution of formaldehyde) and 2.1 parts of caustic soda are mixed (pH about 9) and reacted at a temperature of approximately 60° C. for approximately 3½ hours (pH about 8.62). 2.1 parts of syrupy ortho phosphoric acid (85% $H_3PO_4$) are then added to give a pH of approximately 7.55 and after thorough mixing the material is dehydrated under a pressure of 75 mm. at a temperature of about 50° C. until the solution has a solid content of approximately 60% resinous material. Other vacuums may be used, preferably such that during dehydration the temperature of the mass does not rise above 60° C. The resulting solution is characterized by a complete solubility and miscibility with water in all proportions, even after 2 to 3 months aging at normal workroom temperature (65–72° F.) and with these solutions it is also possible to salt out the water soluble condensation product contained therein and then completely re-dissolve the solids in fresh water to any dilution.

These water soluble compositions are excellent impregnating agents, more especially for cellulose fibers which they readily penetrate. Unlike spirit solutions of similar resin content, they completely saturate the fibers which, upon evaporation of the water, are completely coated both inside and out with the phenol formaldehyde condensation product which on hardening completely waterproofs the fibers. Complete penetration is effected even with textile fibers having pore diameters of the order of one micron or even less. Raw cotton threads may be impregnated with the compositions disclosed herein to have a resin content of about 14% after drying and baking and insulation resistance from 400 to 1000 times higher than the raw cotton threads.

Furthermore there is a marked difference in resin distribution by the use of the herein described resinous compositions when compared either to alcoholic solutions of resin, or to emulsions or to aqueous dispersions of resins of the hydrophilic type which may be diluted with water only to a limited extent without causing resin precipitation. This may be illustrated by treating fibers or fibrous materials with any of the types of resinous solutions, draining off the excess solution, and then drying the impregnated fiber. It will then be found that with emulsions or spirit solutions, practically all of the resinoid is deposited on the surface and can be completely removed from the fibers for instance by washing with a solvent, a major portion can be removed from fibers treated with dispersions of hydrophile resinoids but only a very small percentage can be removed from fibers treated with the resinous composition made according to this invention. The character of the dried fiber will also be greatly different depending on the type of treating material used. Thus fiber treated in the above manner to a 25% or less resin content in emulsions, in spirit solutions or in dispersions of hydrophile resinoids, will be hard and non-flexible whereas fibers impregnated with the resinous materials herein described will be soft and pliable. The different results experienced are probably due to the fact that when using emulsions, spirit solutions and hydrophile resinoid dispersions as treating media, the resin is to a great extent deposited on the surface of the fiber and very little reaches the interior whereas by the use of my resinous solutions miscible in all proportions with water, resin is deposited in the interior of the fiber and in such thin films on the exterior that the pliability and softness of the fiber is not destroyed.

Use of these resinous solutions dilutable to any extent with water has still further advantages when compared to other methods devised for incorporating binders. For example, there is the so-called wet process in which a resinoid binder in the form of a powder or sludge is added to wet pulp in the paper beating machine and the wet pulp formed into a sheet on a suitable paper making machine. In this process, however, the resinoid binder is not deposited within the fiber but largely on the surface thereof and in the form of discrete particles or aggregates. Such a resin fiber material after being heat hardened still has an appreciable water absorption due to the fact that uncoated and unimpregnated fibers act as so many wicks or capillaries up which water is free to travel. Alkaline aqueous solutions of phenolic resinoids have also been used for treatment of fibers. Such solutions give only incomplete penetration of the fiber. The alkaline material used to gain solubility is objectionable whether neutralized or unneutralized. This shows up in decidedly higher water absorption and poorer electrical properties. Furthermore the resin precipitation is a difficult procedure to carry out to give a uniform and well distributed resin. Aqueous resinoid dispersions which can be diluted with water only to a limited extent have also been suggested as impregnating agents and while their use has permitted the production of resin fiber compositions of good water resistance such compositions are inclined to be brittle and hard, and laminated compositions prepared therefrom have been lacking in impact strength.

On the other hand paper or cloth may be impregnated with the resinoid compositions described herein and commercial water resistant laminated materials may be prepared with a resin content as low as 25% whereas when spirit or alcoholic solutions are used a resinoid content of at least 50% is usually necessary to obtain the desired properties. The compositions have unique properties of completely penetrating to the interior of fibers. This property is so very marked that special precautions are desirable in the use of the material. For instance in a laminated structure where good water resistance is desired, it is necessary to have resin both inside and outside the fiber. The inside resin prevents the capillary or "wick action" which pulls water into the fibers. The outside resin acts as a coating and bonding agent for outside surfaces. Resins of the type herein described are particularly suitable for the inside impregnation and perform this function in a manner superior to former products for instance spirit solutions. Thus it is possible to treat sheets of paper with these compositions, subject them to centrifugal action to remove the excess solution and then dry the impregnated sheet; or one may treat the sheets with the material and then rinse or drain off substantially all of the adhering layer on the exterior surface of the paper and then dry. By either method sheets of resin-impregnated fiber are obtained which are soft and pliable. A plurality of such sheets can be bonded together, for example by coating with a spirit solution of resin, to give a laminated material having a total resinoid content of about 25% but which is highly water resistant and of high tensile and impact strength and without the brittleness and lack of shock resistance possessed by a material wherein the sheets have been impregnated by the use of resins of a hydrophile type dilutable with water only to a limited extent.

In the treatment of a large number of natural and synthetic fibers such as cotton, wool, etc., resinoids used in the past have produced an undue stiffening effect, without thorough impregnation of the inside pores of the fiber. Such fibers for many purposes require that their soft and pliable structure be maintained. On the other hand it is desirable to fill the pores of the fiber. Experiment has shown that the stiffening effects of resinoids is due to a large extent to resin in the joints and on outside surfaces of the fiber. The herein described resinoid is particularly suited to this purpose. Due to its inherent penetrating properties, complete penetration of the pores is accomplished. After this impregnation, the fiber can be centrifuged or otherwise washed free of resin on the outside. The well known forces of capillarity hold the resin in place inside the pores against the forces of centrifuging. It is thereby possible in this manner to gain the maximum of inner impregnation with the minimum stiffening effect.

After fiber impregnation, it is necessary to remove the moisture prior to the final hardening. This water removal may cause a partial resin migration toward the surface, that is, as the water leaves the structure it is followed toward the surface by the resin. Particularly in the case of thick structures this may result in decidedly higher resin concentrations at the surface, with a consequent lowering of resin content in the center. For certain purposes, for instance where only a hard surface is desired, this may be an advantage. Where undesirable, such migration can be eliminated by polymerizing the resin in the structure in a steam vulcanizer or under such other conditions of elevated temperature and/or pressure that evaporation does not take place. This polymerization is carried to such a point that the resin is no longer water soluble and therefore shows no migration during the subsequent drying operation. The polymerization is preferably not carried so far as to render the resin insoluble prior to water removal.

Resinous compositions completely miscible with water find a particular application in brake linings for the impregnation of asbestos yarn, paper, millboard or fabrics. It is desirable in the preparation of friction materials to use the minimum amount of binder yet such a binder must be distributed uniformly throughout the friction lining; consequently, the ideal binder is one which is highly penetrative and possesses the maximum spread or ability to cover the fabric with a hard, water resistant, heat resistant film both inside and outside the fibers. These conditions are fulfilled by the resinous compositions herein disclosed and friction linings impregnated with such materials are highly water, heat and wear resistant.

Such resinous materials are also excellent binders for very finely divided fillers of extremely small dimensions, for instance carbon, graphite, abrasives for grinding wheels, sandpaper and the like either as the total, intermediate or final bond and are extensively employed as binders for carbon brushes, carbon resistors, etc., and also may be used to waterproof the paper or cloth for sandpaper or as a top size coat.

In the case of non-fibrous non-porous fillers, for instance, graphite, silica, etc., these compositions are particularly useful since their fluidity and water solubility permit the deposition of very thin and uniform films over the surface of the filler. Thus the maximum binding effect of the resin can be utilized. This is particularly important in cases where low resin content is necessary either from a cost or other standpoint. For instance with sand of the type and mesh commonly used for sand cores, it is now possible to use as low as 1.5% resinoid on the weight of the sand, as bond and yet obtain a dense structure satisfactory from strength, sharpness of definition, and handling characteristics.

These materials also blend readily with latex dispersions. Being stabilized as regards hydrogen ion concentration and completely water soluble they do not precipitate the latex when mixed therewith. Such combinations may be used for the impregnation of textiles, or as coating materials for fabrics of various sorts and have an unexpectedly high heat resistance. The films deposited from such resin latex combinations possess a wide range of elasticity due to the presence of the latex as the mixtures may be made in any proportions.

The stability of these resinous materials has many other advantages besides that resulting from their miscibility with dispersions such as latex which are precipitated by dispersions too acid in character; for instance such resinoids have been found generally miscible with other water soluble bonds now used commercially. Bonding materials of the glyceryl borate, molasses residue, or lignin types are miscible in all proportions with the compositions of this invention. In general any ratio of resinoid to water soluble bond can be made to suit a specific condition; however the greatest percentage improvement will be obtained by using the phenol resinoid as the minor constituent. The phenol resinoid gives strength, heat and moisture resistance to the composite structure in an unexpected amount of proportion to the quantity of resinoid introduced.

Thus by stabilizing the hydrogen ion concentration it is also possible to stabilize the viscosity and retain the water miscibility which these resins possessed at the time of manufacture. Such solutions permit of many economies in the manufacture of impregnated and coated materials. Stocks of raw materials may be carried sufficient for several months' production. Continuous processes may be employed without making annoying and time consuming adjustments to the coating or impregnating apparatus which are always necessary when materials of continually varying viscosity are employed. Variations in water miscibility also necessitate adjustments in the commercial use of materials. Fabrics and textiles must be carefully adjusted as to moisture content otherwise the water present is liable to precipitate out resins from those dispersions which tolerate only a limited dilution. No such adjustments need be made, however, if the water miscibility of the resin dispersions remains practically the same as when originally manufactured. Stable resin dispersions require no change in formulation after having been adapted to any designed process and one batch of material can be expected to function and give the same results as any other batch.

I claim:

1. Composition of matter comprising a synthetic resinous material, said material consisting of the product from the reaction of a member of the group consisting of phenol and its homologs with an aldehyde in the presence of a small amount of alkaline catalyst to give a pH of the reaction mixture not substantially greater than 10, said material containing from about 1.10 to 1.75 mols of combined aldehyde per mol of the member of said group, said material after manufacture being inherently water soluble and capable of remaining in water solution in greater dilution than about 30 parts of the material to 70 parts of water.

2. Composition of matter comprising a potentially reactive synthetic resinous material, said material consisting of the product from the reaction of a member of the group consisting of phenol and its homologs with an aldehyde in the presence of a small amount of alkaline catalyst to give a pH of the reaction mixture not substantially greater than 10, said material containing a minimum of about 1.1 mols of aldehyde per mol of the member of said group and after manufacture being inherently water soluble and capable of remaining in water solution in greater dilution than about 30 parts of the material to 70 parts of water and capable of hardening under heat and pressure.

3. Composition of matter comprising a water solution of a synthetic resinous material, said material consisting of the product from the reaction of a member of the group consisting of phenol and its homologs with an aldehyde in the presence of a small amount of alkaline catalyst to give a pH of the reaction mixture not substantially greater than 10, said material after manufacture being inherently water soluble and capable of remaining in water solution in greater dilution than about 30 parts of the material to 70 parts of water, said composition being characterized in that such a solution containing about 60 per cent of the reaction product and about 40 per cent of water has a viscosity between 30 and 40 k.v. at 25° C. when freshly prepared and a viscosity of not more than 60 k.v. after two weeks.

4. Composition of matter comprising a water solution of a synthetic resinous material, said material consisting of the product from the reaction of a member of the group consisting of phenol and its homologs with an aldehyde in the presence of a small amount of alkaline catalyst to give a pH of the reaction mixture not substantially greater than 10, said material after manufacture being inherently water soluble and capable of remaining in water solution in greater dilution than about 30 parts of the material to 70 parts of water, said composition being characterized in that such a solution containing about 60 per cent of the reaction product and about 40 per cent of water has a viscosity between 30 and 40 k.v. at 25° C. when freshly prepared and a viscosity between 30 and 60 k.v. after two months.

5. Process which comprises reacting in water solution a member of the group consisting of phenol and its homologs with an aldehyde, in the presence of a small amount of alkaline catalyst to give a pH in the reaction mixture not substantially greater than 10, until a minimum of about 1.1 mol of the aldehyde has reacted per mol of the member of said group in the reactants and a synthetic resinous material has formed, stopping the reaction after the said amount of aldehyde body has reacted and while the reaction product is in solution and capable of remaining in water solution in greater dilution than about 30 parts of the reaction product to 70 parts of water.

6. Process which comprises forming a resinous phenol aldehyde reaction product by reacting in water solution a member of the group consisting of phenol and its homologs with an aldehyde, in the presence of a small amount of alkaline catalyst to give a pH in the reaction mixture not substantially greater than 10, until a minimum of about 1.1 mol of the aldehyde has reacted per mol of the member of said group in the reactants and a synthetic resinous material has formed, stopping the reaction after the said amount of aldehyde body has reacted and while the reaction product is in solution, and neutralizing the solution while maintaining the reaction product in a condition capable of remaining in water solution in greater dilution than about 30 parts of the reaction product to 70 parts of water.

7. Composition comprising a filler and in association therewith a synthetic resinous material comprising a phenol aldehyde reaction product, said product consisting of the resinous reaction product of a member of the group consisting of phenol and its homologs with an aldehyde in the presence of a small amount of alkaline catalyst to give a pH of the reaction mixture not substantially greater than 10, said product containing a minimum of about 1.1 mols of aldehyde per mol of the member of said group and after manufacture being inherently water soluble and capable of remaining in water solution in greater dilution than about 30 parts of the product to 70 parts of water.

8. Composition comprising a cellular filler and within the cells of the filler a synthetic resinous material comprising a phenol aldehyde reaction product, said product consisting of the resinous reaction product of a member of the group consisting of phenol and its homologs with an aldehyde in the presence of a small amount of alkaline catalyst to give a pH of the reaction mixture not substantially greater than 10, said product containing a minimum of about 1.1 mols of aldehyde per mol of the member of said group and after manufacture being inherently water soluble and capable of remaining in water solution in greater dilution than about 30 parts of the product to 70 parts of water.

9. Method of treating cellular fibrous material which comprises preparing a water solution of a resinous reaction product of a member of the group consisting of phenol and its homologs with an aldehyde, in the presence of a small amount of alkaline catalyst to give a pH in the reaction mixture not substantially greater than 10, treating the fibrous material with said water solution and causing the reaction product to penetrate the cells of the fibrous material, hardening the reaction product within the cells and removing the water leaving the reaction product in the cells of the fiber.

10. Method of treating cellular fibrous material which comprises preparing a water solution of a resinous reaction product of a member of the group consisting of phenol and its homologs with an aldehyde, in the presence of a small amount of alkaline catalyst to give a pH in the reaction mixture not substantially greater than 10, said reaction product containing at least 1 mol of reacted aldehyde per mol of the member of said group and being capable of remaining in water solution in greater dilution than about 30 parts of the material to 70 parts of water, treating the fibrous material with said water solution, removing the water leaving the reaction product in association with the fiber and hardening the said reaction product.

VIRGIL E. MEHARG.